US011913628B2

(12) United States Patent
Chinnam

(10) Patent No.: US 11,913,628 B2
(45) Date of Patent: Feb. 27, 2024

(54) MODULAR SOCKET

(71) Applicant: SIGNIFY HOLDING B.V., Eindhoven (NL)

(72) Inventor: Solomon Chinnam, Austin, TX (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/761,924

(22) PCT Filed: Sep. 21, 2020

(86) PCT No.: PCT/EP2020/076211
§ 371 (c)(1),
(2) Date: Mar. 18, 2022

(87) PCT Pub. No.: WO2021/058407
PCT Pub. Date: Apr. 1, 2021

(65) Prior Publication Data

US 2024/0003529 A1 Jan. 4, 2024

Related U.S. Application Data

(60) Provisional application No. 62/905,499, filed on Sep. 25, 2019.

(30) Foreign Application Priority Data

Oct. 10, 2019 (EP) .................................... 19202510

(51) Int. Cl.
*F21V 23/06* (2006.01)
*H01R 33/945* (2006.01)
(Continued)

(52) U.S. Cl.
CPC ......... *F21V 23/06* (2013.01); *H01R 33/9456* (2013.01); *F21Y 2115/10* (2016.08); *H01R 13/6683* (2013.01)

(58) Field of Classification Search
CPC .......... F21V 23/06; F21V 23/00; F21V 23/02; F21Y 2115/10; H01R 13/6683;
(Continued)

(56) References Cited

U.S. PATENT DOCUMENTS 6,016,038 A 1/2000 Mueller et al.
6,211,626 B1 4/2001 Lys et al.
(Continued)

FOREIGN PATENT DOCUMENTS

CN 101094549 A 12/2007

*Primary Examiner* — Bao Q Truong

(57) ABSTRACT

A modular socket (106, 306) for removably receiving a light-emitting diode ("LED") driver (124, 324) and coupling the LED driver to LED(s) (104) is described herein and may include: a housing (108, 308); a power input interface (110, 310) to receive a supply voltage; a power output interface (120, 320) electrically coupled with the power input interface within the housing; an LED control input interface (128, 328) that is electrically coupled with one or more LEDs; and one or more mechanical engagement and locking structures (134, 334). Mechanical engagement of the mechanical engagement and locking structures with corresponding mechanical engagement and locking structures of the LED driver may simultaneously effect electrical coupling between: the power output interface and a power input interface (122, 322) of the LED driver, and the LED control input interface and an LED output interface (126, 326) of the LED driver.

15 Claims, 4 Drawing Sheets

(51) Int. Cl.
*H01R 13/66* (2006.01)
*F21Y 115/10* (2016.01)

(58) Field of Classification Search
CPC ............................ H01R 33/9456; H01R 13/00; H01R 13/6608; H01R 13/66; H01R 33/00; H01R 33/945
See application file for complete search history.

(56) References Cited

U.S. PATENT DOCUMENTS

| | | | | |
|---|---|---|---|---|
| 9,894,740 | B1 | 2/2018 | Liszt et al. | |
| 10,309,637 | B2 | 6/2019 | Zhang et al. | |
| 10,323,835 | B1 | 6/2019 | Anderson | |
| 10,544,929 | B2 * | 1/2020 | Zeng | H01R 12/7005 |
| 2014/0119022 | A1 | 5/2014 | Beausoleil | |
| 2015/0137683 | A1 * | 5/2015 | Krames | F21V 23/006 315/294 |
| 2015/0334807 | A1 | 11/2015 | Gordin et al. | |
| 2016/0053952 | A1 | 2/2016 | Kuti et al. | |
| 2016/0215969 | A1 | 7/2016 | Zhai et al. | |
| 2018/0288860 | A1 * | 10/2018 | Vendetti | H05B 47/19 |
| 2019/0008045 | A1 | 1/2019 | Iedema et al. | |
| 2019/0107273 | A1 | 4/2019 | Agrawal et al. | |
| 2019/0170306 | A1 | 6/2019 | Athalye et al. | |

* cited by examiner

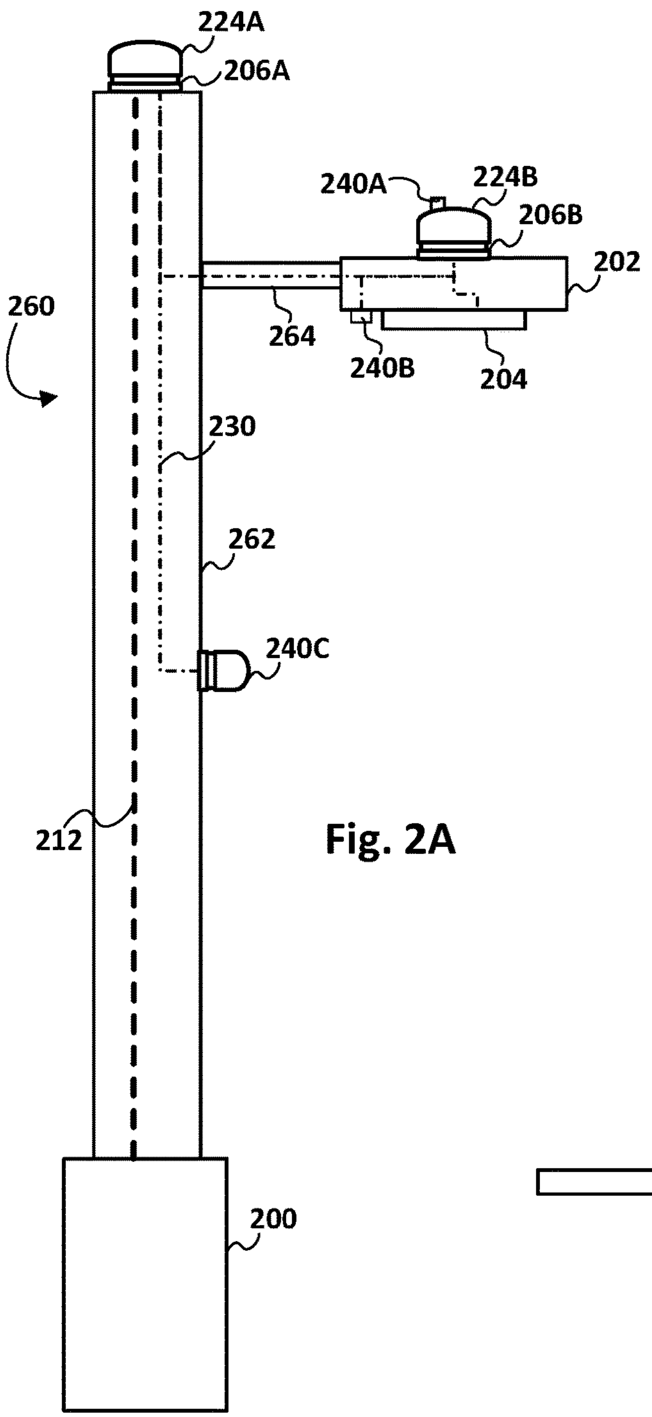
Fig. 2A
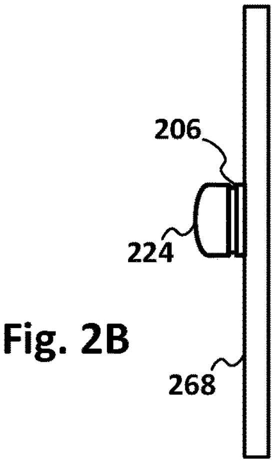
Fig. 2B
Fig. 2C
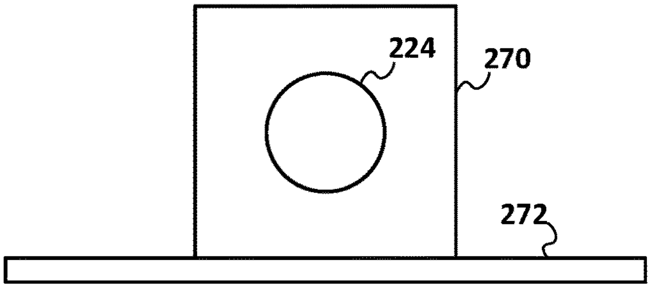

MODULAR SOCKET

CROSS-REFERENCE TO PRIOR APPLICATIONS

This application is the U.S. National Phase application under 35 U.S.C. § 371 of International Application No. PCT/EP2020/076211, filed on Sep. 21, 2020, which claims the benefit of European Patent Application No. 19202510.4, filed on Oct. 10, 2019, which claims the benefit of U.S. Provisional Patent Application No. 62/905,499, filed on Sep. 25, 2019. These applications are hereby incorporated by reference herein.

TECHNICAL FIELD

The present invention is directed generally to lighting. More particularly, various inventive methods and apparatus disclosed herein relate to modular sockets.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Historically, LED drivers have been designed to be mounted inside of a luminaire, which increases the overall size and weight of the luminaire. This in turn increases costs due to structural and/or thermal needs of the luminaire. In addition, having separate components and/or modules such as, for instance, surge protection, dimming controls, daylight sensors, LED drivers, all as individual components makes wiring a huge challenge, increasing cost further. In addition, replacement of failed electronic components within a luminaire can be quite time consuming and/or costly, largely due to having a skilled technician manually rewire these components.

SUMMARY

The present disclosure is directed to inventive apparatus for modular sockets. More particularly, in various embodiments, a modular socket configured with selected aspects of the present disclosure may serve multiple functions while also constituting a simple mechanical interface for secure yet removable attachment of other modular components—e.g., LED drivers, sensors, surge protection, etc.—to luminaires.

As an example of multiple functions that may be served by a module socket configured with selected aspects of the present disclosure, upon mechanical engagement of an LED driver with the modular socket, the modular socket may simultaneously electrically couple (i) a power output interface of the modular socket and a power input interface of the LED driver, as well as (ii) an LED control input interface that is electrically coupled with one or more LEDs and an LED output interface of the LED driver. In this way, the modular socket may receive input in the form of high voltage A/C current (e.g., 120V to 277V) and provide (as output) the supply voltage to a removably attachable LED driver (or, if another kind of light source is used, a ballast). The modular socket may also route output of the LED driver (e.g., a modulated direct current to the one or more LEDs of a luminaire.

The modular socket may be mountable at various locations on a luminaire, as well as remote from the luminaire. For example, the socket may be positioned on top of a luminaire portion of a lamppost, such that an LED driver can be removably plugged into the socket at a location that is not easily reachable by vandals. As another example, the socket may be positioned on a vertical post of a lamppost so that it is more easily reachable by technicians seeking to replace or install a modular LED driver or other modular component. In this case, various mechanisms may be employed to secure the mechanical engagement against tampering.

In some embodiments, a single modular socket may be mounted to serve multiple luminaires. For example, multiple horizontal extensions may protrude from a single vertical post of a multi-luminaire lamppost, and each horizontal extension may host a luminaire. A single modular socket configured with selected aspects of the present disclosure may be mounted somewhere on the multi-luminaire lamppost. The modular socket may receive and supply voltage to a single LED driver that controls LEDs of the multiple luminaires, as well as distribute modulated direct current generated by the LED driver to LEDs of each of the multiple luminaires. In some embodiments, an electro-mechanical mechanism may be provided, e.g., on each of the multiple luminaires, to capture and forward digital information to intelligent/smart LED drivers, e.g., on top of lamppost(s). In some such embodiments, the modular socket itself may have flying leads, or may have push-in type header nodes for easy install of leads.

Embodiments described herein may also facilitate simple addition, removal, and/or replacement of various sensors. These sensors may take various forms, including but not limited to motion sensors, daylight sensors, traffic sensors, Internet of things ("IoT") modules with wired and/or wireless communication capabilities, etc. In some embodiments, a modular socket configured with selected aspects of the present disclosure may include, e.g., in its interior, one or more sensor busses to which sensors and/or external sensor busses can be electrically and/or communicatively coupled. For example, in response to mechanical engagement of the modular socket with an LED driver, the internal sensor bus may be electrically coupled with another sensor bus that is contained within the LED driver.

In some embodiments, sensors may be operably coupled to the modular socket and/or to other components that are plugged into the modular socket. For example, one or more sensors may be attached to an LED driver that is plugged into the modular socket. As mentioned previously, a sensor bus internal to the LED driver may be electrically coupled with the sensor bus that is internal to the modular socket via the mechanical engagement of the LED driver and the modular socket. Thus, the mechanical engagement effectively creates a single sensor bus to which sensors connected to the modular socket via the LED driver and other sensors connected directly to the modular socket are operably coupled.

Generally, in one aspect, a modular socket for removably receiving a light-emitting diode ("LED") driver and coupling the LED driver to one or more LEDs may include: a housing; a power input interface to receive a supply voltage; a power output interface electrically coupled with the power input interface within the housing; an LED control input interface that is electrically coupled with one or more LEDs; and one or more mechanical engagement and locking structures, wherein mechanical engagement of one or more of the mechanical engagement and locking structures with one or more corresponding mechanical engagement and locking structures of the LED driver simultaneously effects electrical coupling between: the power output interface and a power input interface of the LED driver, and the LED control input interface and an LED output interface of the LED driver.

In various embodiments, the electrical coupling effected by the mechanical engagement may include a male pin being inserted into a female contact, and the power output interface of the modular socket may be the female contact. In various embodiments, a mass of the LED driver is substantially supported by the mechanical engagement. In various embodiments, the one or more mechanical engagement and locking structures comprise a plurality of mechanical engagement and locking structures positioned and spaced around a perimeter of the housing to provide a polarity-based locking mechanism.

In various embodiments, the modular socket may include: one or more sensor output interfaces; wherein the mechanical engagement further effects electrical coupled between one or more sensors electrically coupled with the modular socket and the LED driver. In various embodiments, the one or more sensors may include a motion sensor. In various embodiments, the one or more sensors may include a wireless communication interface. In various embodiments, the modular socket may further include a removable health monitoring component that, when triggered, causes the modular socket to provide audible or visual output of a fault.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The terms "lighting fixture" and "luminaire" are used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 2A, 2B, and 2C depict examples of how a modular socket configured with selected aspects of the present disclosure may be deployed, in accordance with various embodiments.

DETAILED DESCRIPTION

Historically, LED drivers have been designed to be mounted inside of a luminaire, which increases the overall size and weight of the luminaire. This in turn increases costs due to structural and/or thermal needs of the luminaire. In addition, having separate components and/or modules such as, for instance, surge protection, dimming controls, daylight sensors, LED drivers, all as individual components makes wiring a significant challenge, increasing cost further. In addition, replacement of failed electronic components within a luminaire can be quite time consuming and/or costly, largely due to having a skilled technician manually rewire these components. In view of the foregoing, various embodiments and implementations of the present invention are directed to modular sockets and components that can be removably plugged into these modular sockets.

Figure 1:
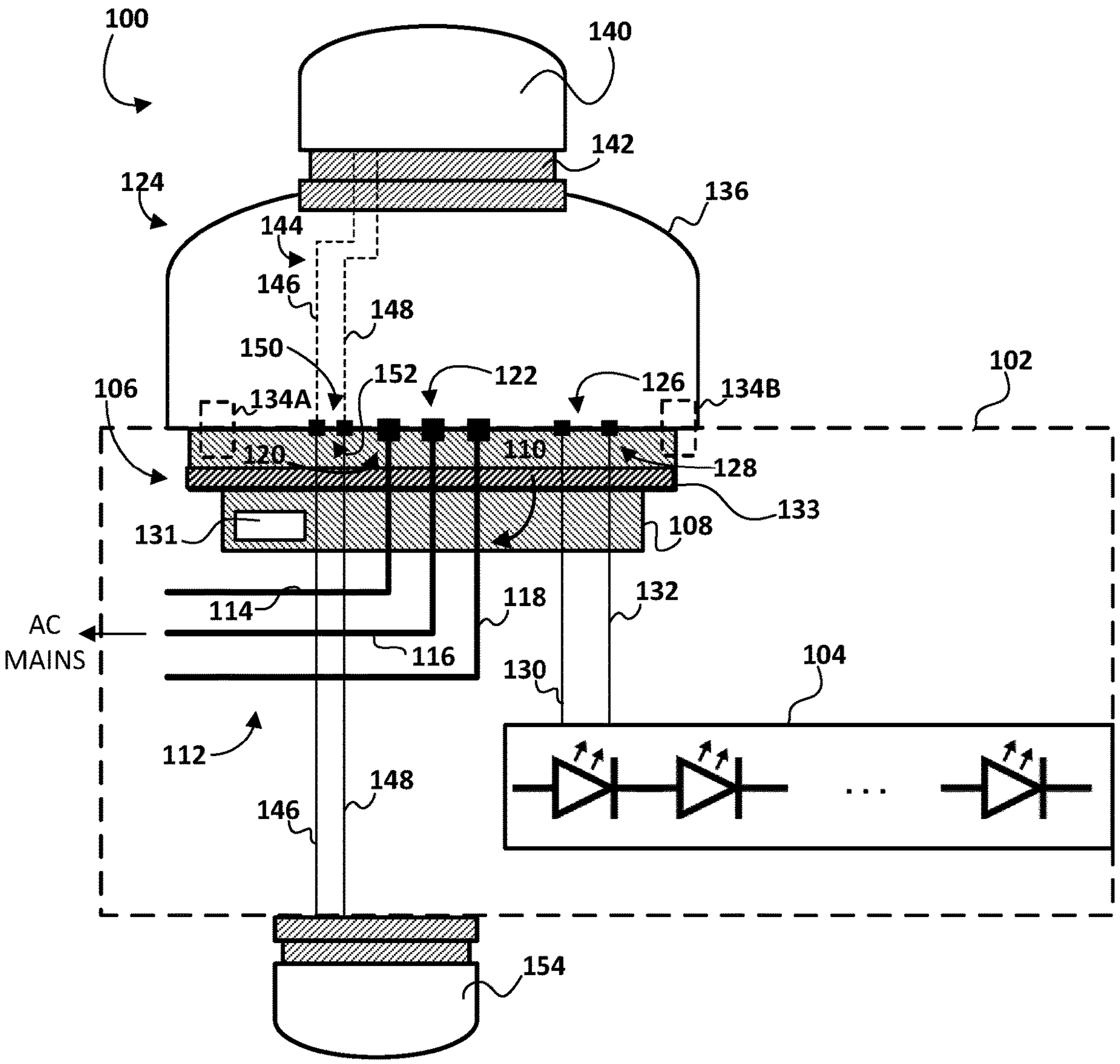
FIG. 1 schematically illustrates an example modular socket in use with other components, in accordance with various embodiments.

Referring to FIG. 1, in one embodiment, a lighting assembly 100 includes a luminaire 102 that includes one or more light sources 104. In FIG. 1, one or more light sources 104 include a plurality of LEDs. However, this is not meant to be limiting. As noted previously, any type of light source, such as fluorescent, halogen, incandescent, and so forth, may be employed, alone or in combination with other types of light sources, as part of luminaire 102.

A modular socket 106 configured with selected aspects of the present disclosure is depicted as part of luminaire 102 in FIG. 1. FIG. 1 is a schematic drawing, so the fact that modular socket 106 is depicted entirely within the dashed line forming luminaire 102 should not be taken as limiting. Modular socket 106 may have an outer surface that protrudes from a luminaire housing (not depicted), is recessed into a luminaire housing, is flush with a luminaire housing, and so forth.

In various embodiments, modular socket 106 may include a housing 108 that may be constructed with various materials or combinations of materials, including but not limited to polymers, metals, rubbers, etc. Modular socket 106 may also include a power input interface 110 (e.g., which may support up to 480V in some embodiments) to receive a supply voltage 112. In FIG. 1, supply voltage 112 includes a hot wire 114, a neutral wire 116, and a ground wire 118. One or more of wires 114-118 may be omitted in other embodiments. Supply voltage 112 may be, for instance, alternating current (A/C) received from A/C mains, and may provide various magnitudes of voltages, such as anywhere from 120V to 480V, or any other high voltage value.

Modular socket 106 may also include a power output interface 120 electrically coupled within housing 108 with power input interface 110. In various embodiments, the coupling of power output interface 120 and power input interface 110 may be implemented using wires, via solid conductive paths (e.g., using copper or other conductive materials), and so forth.

Power output interface 120 may be electrically coupled with a power input interface 122 of an LED driver 124. Supply voltage 112 may be routed by modular socket 106 from its source (e.g., AC mains) to LED driver 124. LED driver 124 may receive this supply power, convert it to direct current ("DC") if applicable, modulate the directed current based on various factors, and provide the modulated direct current through an LED output interface 126 to an LED control input interface 128 of modular socket 106. LED control input interface 128 may be electrically coupled with one or more LEDs 104 via one or more control lines 130, 132 (e.g., positive and negative control lines). By this electrical path, modular socket 106 may route the modulated direct current (or alternating current in some cases) to one or more light sources 104.

In some embodiments, modular socket 106 and/or LED driver 124 may include a removable health monitoring component 131 that, when triggered, causes modular socket 106 (or LED driver 124 as the case may be) to provide audible or visual output of a fault. For example, removable health monitoring component 131 may include a fuse or other electrical component that is destroyed or damages under certain circumstances, such as lighting strike, short circuit, malfunction of one or more components, improper polarity between internal components (i.e., improper installation), lack of LED driver 124, etc. In some embodiments, modular socket 106 and/or LED driver 124 may include an indicator such as a circumferential light source 133 that emits light of a certain color, intensity, or modulated pattern to indicate to a passerby that some portion of the assembly 100 is malfunctioning and/or needs to be replaced. Although circumferential light source 133 is depicted as part of socket 106, this is not meant to be limiting. In various embodiments, a light source may be additionally or alternatively disposed on other components, such as LED driver 124.

In various embodiments, modular socket 106 and/or LED driver 124 may include one or more mechanical engagement structures, two of which are depicted at 134A and 134B. These structures may take various forms and may be disposed at various positions of modular socket 106 and/or LED driver 124. For example, one or more of these structures 134 may be disposed on housing 108 of modular socket 106. Additionally or alternatively, one or more of these mechanical engagement structures 134 may be disposed on a housing 136 of LED driver 124, e.g., proximate a portion of LED driver (bottom in FIG. 1) that is designed for engagement with modular socket 106.

In various embodiments, mechanical engagement of one or more of the mechanical engagement structures 134 with one or more corresponding mechanical engagement structures 134 of LED driver 124 may simultaneously effect electrical coupling between (a) power output interface 120 of modular socket 106 and power input interface 122 of the LED driver, and (b) LED control input interface 128 and LED output interface 126 of LED driver 124. For example, in some embodiments, once LED driver housing 136 is brought into sufficient proximity of, or even into physical contact with, housing 108 of modular socket 106, one or both of LED housing 136 and housing 108 of modular socket 106 may be rotated, pressed, or otherwise mechanically influenced in order to mechanically engage (e.g., lock, secure) structures 134 of LED driver housing 136 with housing 108 of modular socket 106. This mechanical influencing may ensure that electrical contacts (e.g., 122, 126) of LED driver 124 are properly and securely electrically coupled with corresponding electrical contacts (e.g., 120, 128) of modular socket 106.

LED driver 124 may modulate direct current provided to one or more light sources 104 in various ways based on a variety of different signals. Many of these signals may be generated by a variety of different types of sensors. In FIG. 1, for instance, a first sensor 140 is operably coupled to a top of LED driver 124 by way of a socket 142. Socket 142 may take various forms, such as a socket that is in conformance with one or more books of the Zhaga Standard (https://www.zhagastandard.org/), a universal serial bus ("USB") socket, or any other type of socket connection that is usable to transfer data and, where applicable, power. In various implementations, sensors can be removably replaced at socket 142 as desired. While one socket 142 is depicted on LED driver 124 in FIG. 1, this is not meant to be limiting. In various embodiments, any number of sockets, which may be the same as or different from each other, may be provided on housing 136 of LED driver 124.

Socket 142 may operably couple first sensor 140 (or whatever other sensor may be installed in socket 142) with a sensor bus 144 that may include one or more wires 146, 148 that may correspond to, for instance, positive and negative sensor terminals or contacts. Sensor bus 144 may be effectively extended into an interior of housing 108 of modular socket 106 by way of electrical coupling of a sensor output interface 150 of LED driver 124 with a sensor input interface 152 of modular socket 106. Sensor bus 144 may extend from modular socket 106 into, for instance, a second sensor 154.

First sensor 140 may take various forms. In some embodiments, first sensor 140 may be a daylight sensor that is configured to provide a signal indicative of light it senses. This signal may be used by LED driver 124, for instance, to determine whether to illuminate one or more light sources 104 of a streetlamp, to select a level of intensity to emit from one or more light sources 104, to select one or more colors of light to be emitted by one or more light sources 104, to select one or more light modulated patterns (e.g., coded light) to be emitted by one or more light sources 104, and so forth. Other types of sensors may also be affixed to housing 136 of LED driver 124, including but not limited to traffic sensors, presence sensors, IoT communication components (e.g., to communicate wirelessly with passing vehicles or pedestrians), thermometers, barometers, or other components such as fault lights, indicators, etc.

Like first sensor 140, second sensor 154 may take various forms. In some embodiments in which luminaire 102 is part of a streetlamp, first sensor 140, when mounted on top of LED driver 124 as shown in FIG. 1, may not face a street surface below. Accordingly, second sensor 154 (which in this example may be a presence sensor or traffic sensor) may be positioned on the lamppost, e.g., on a vertical post or on the bottom of a horizontal post on which luminaire 102 is mounted, so that second sensor 154 has a view of the street below.

FIGS. 2A-C schematically depict example use cases that demonstrate how a modular socket configured with selected aspects of the present disclosure may be deployed in various scenarios. In FIG. 2A, a lamppost 260 such as a streetlamp includes a vertical post 262 and a horizontal bar 264 extending therefrom. Inside of vertical post 262 is a high voltage power supply 212 that may share various characteristics with element 112 in FIG. 1. Power supply 212 extends from a power source (not depicted) to a first modular socket 206A that is situated on top of vertical post 262. A first LED driver 224A is secured to first socket 206A. First modular socket 206A is operably coupled with one or more control lines 230 for routing direct current generated by first LED driver 224A to other components, such as one or more light sources 204 of a luminaire 202 disposed on horizontal bar 264.

Additionally or alternatively, in some embodiments, a second modular socket 206B may be disposed on top of luminaire 202. In some embodiments, both first and second modular sockets 206A, 206B may be present. In other embodiments, only one or the other is present. A second LED driver 224B is installed on second modular socket 206B. Attached to second LED driver 224B is a first sensor 240A, which may be, for instance, a daylight sensor, a wireless communication component, etc. A second sensor 240B is attached to an underside of luminaire 202 and may take the form of, for instance, a traffic or presence sensor. As shown, second sensor 240B is operably coupled second LED driver 224B by way of control lines 230. In some embodiments, in addition to or instead of sensors 240A-B, a third sensor 240C may be attached remotely from any LED drivers, such as on vertical post 262.

In some implementations, rather than (or in addition to) third sensor 240C, another modular socket could be disposed near a bottom of vertical post 262 so that the modular socket is easily reachable. In this way, an LED driver or another component could be relatively easily replaced, e.g., without requiring equipment to raise a technician up high. Mounting a modular socket at such a low position, and having a single modular socket direct power to multiple luminaires/LED drivers, may be particularly advantageous with relatively tall lighting fixtures, such as some lamps that are used to illuminate highways, stadium lights, or other similar lighting assemblies in which the luminaires are difficult to reach and/or numerous. If the low-positioned LED driver or modular socket is vandalized, that may be detected, for instance, by health monitoring component 131, which may raise an alarm over one or more networks or via a flashing light (e.g., from circumferential light source 133).

FIG. 2B depicts an example in which a modular socket 206 configured with selected aspects of the present disclosure is mounted to a wall 268. Although not depicted in FIG. 2B, modular socket may include the various interfaces shown in FIG. 1, and thereby may be operably and/or electrically coupled with various remote components, such as one or more ceiling luminaires, wall-mounted luminaires, etc. An LED driver 224 is depicted installed on modular socket 206. LED driver 224 may be easily installed and/or replaced by virtue of mechanical engagement (or disengagement) with modular socket 206. Moreover, if mounted low enough on wall 268, a person can easily reach LED driver 224 to, for instance, install one or more sensors (e.g., presence sensors to turn on a ceiling light when a person walks by). FIG. 2C depicts an alternative example in which an LED driver 224 is installed in a modular socket (not visible from the perspective of FIG. 2C) that is disposed on a junction box 272.

Figure 3:
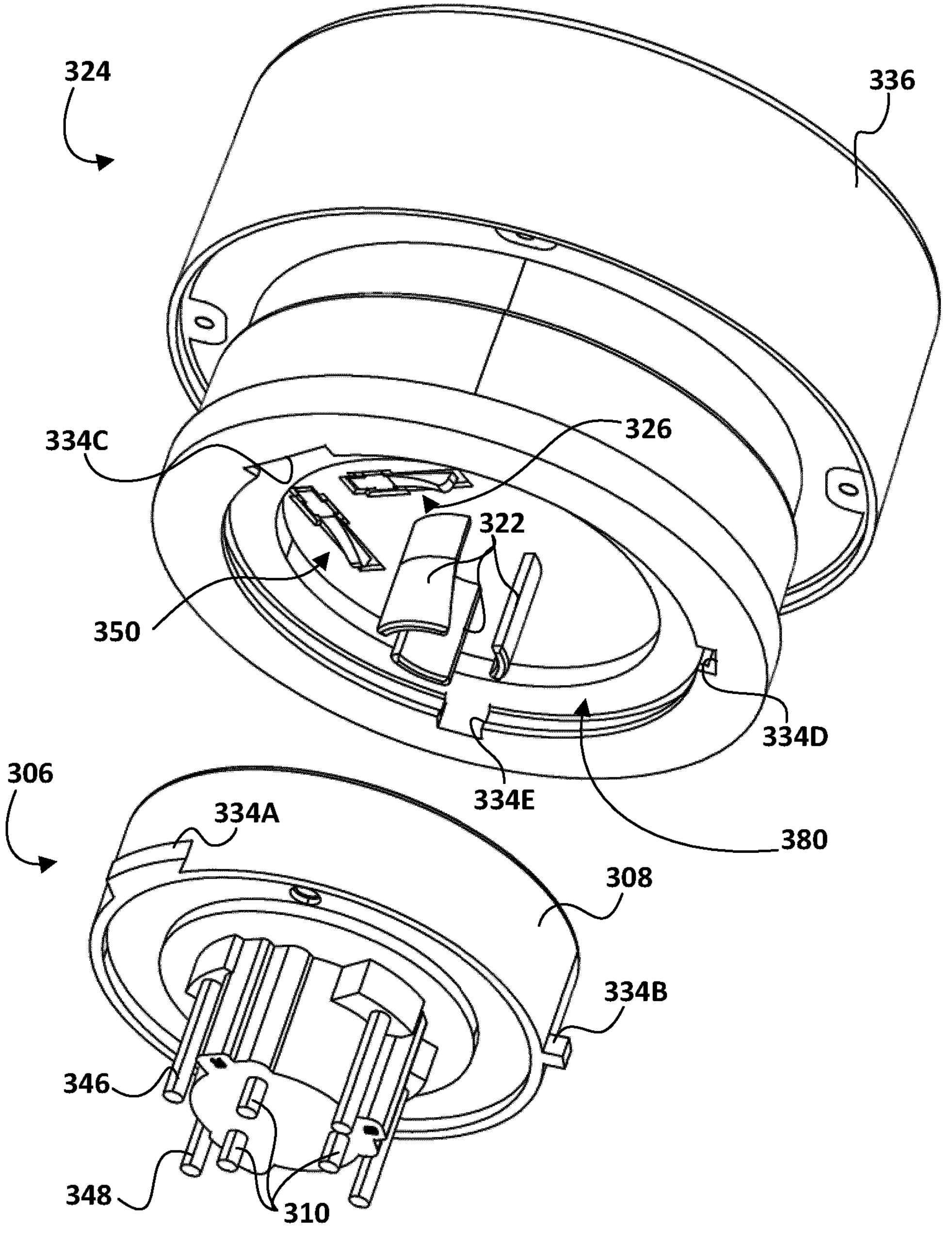
FIG. 3 is a perspective view of an arrangement of an example modular socket and a modular LED, in accordance with various embodiments.
Figure 4:
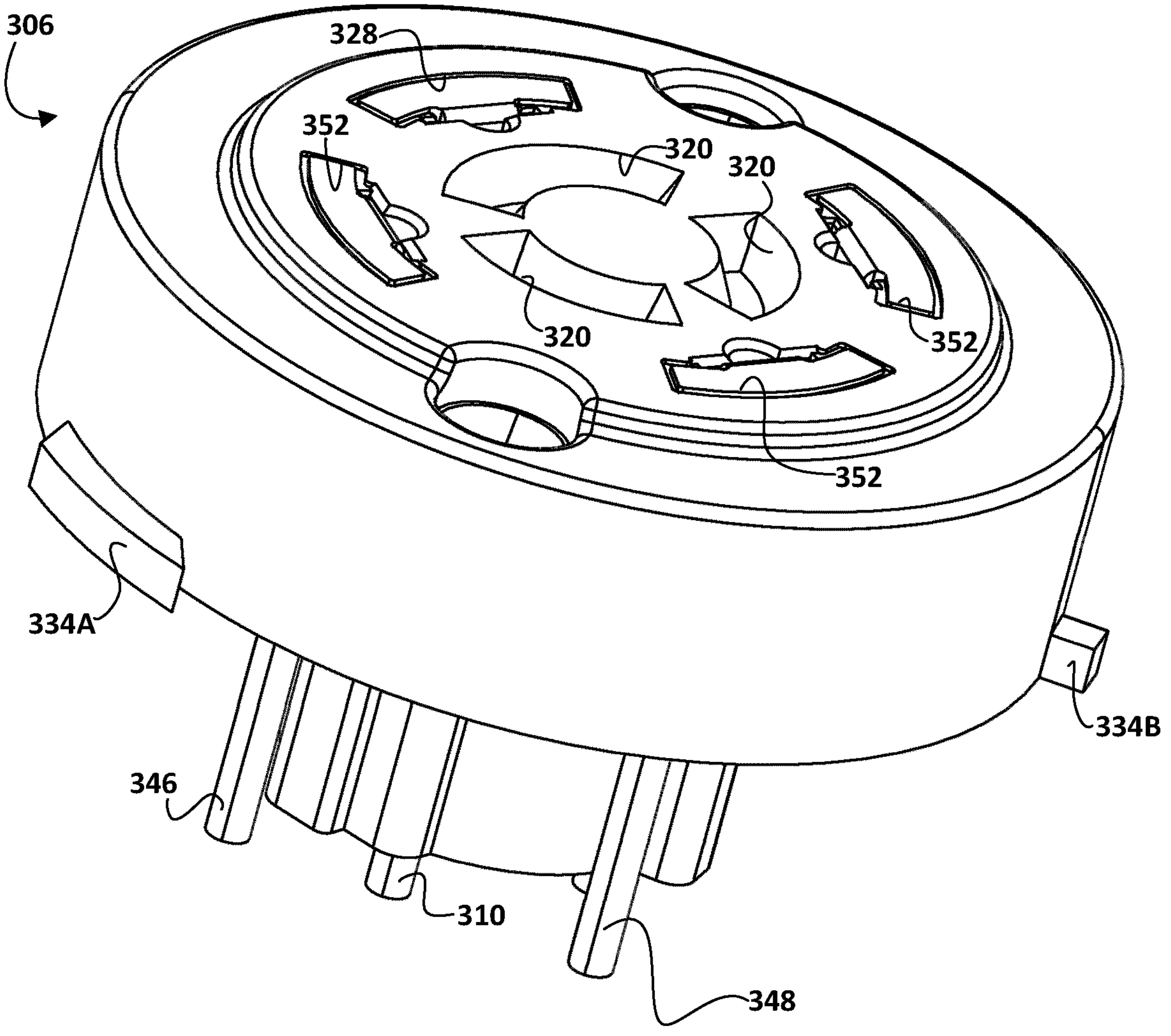
FIG. 4 is a different perspective view of the modular socket of FIG. 3.

FIG. 3 depicts a perspective view of both an example modular socket 306 and an example LED driver 324 configured with selected aspects of the present disclosure. FIG. 4 depicts the modular socket 306 from a different perspective. Turning to LED driver 324 first, LED driver 324 includes a housing 336 and an interface portion 380 at one end of housing 336. Interface portion 380 includes components that are configured for electrical coupling with corresponding components of modular socket 306 and components that are configured for mechanical engagement with corresponding components of modular socket 306.

LED driver 324 includes a power input interface 322 in the form of three metallic prongs that act as a "male" portion of a socket connection between LED driver 324 and modular socket 306. More or less prongs may be provided. In some embodiments, power input interface 322 of LED driver may take the form of a National Electric Manufacturers Association ("NEMA") compliant plug, although this is not required. LED driver 324 also includes one or more sensor output interfaces 350 that may share one or more characteristics with sensor output interface 150 of FIG. 1.

A bottom surface of modular socket 306 is visible in FIG. 3, revealing various components of modular socket 306. These include, for instance, a power input interface 310 that shares one or more characteristics with power input interface 110 in FIG. 1. In particular, three electrical pathways are visible in FIG. 3, corresponding to the three male prongs of LED driver 324. Also visible in FIG. 3 are one or more wires 346, 348 (which more generally can be conductive paths)

that may correspond to, for instance, positive and negative sensor terminals or contacts (e.g., 146, 148 in FIG. 1).

A variety of mechanical engagement elements 334 are also visible in FIG. 3. In some embodiments, a mass of LED driver 324 may be substantially or entirely supported by the mechanical engagement of mechanical engagement elements 334A-B of modular socket 306 with corresponding mechanical engagement elements 334C-E of LED driver 324. In some embodiments, the one or more mechanical engagement and locking structures 334 may include a plurality of mechanical engagement and locking structures 334A-D positioned and spaced around perimeters of housings 308, 336. More or less mechanical engagement and locking structures 334 may be provided, and may be referred to herein alternatively as "mechanical engagement structures."

For example, LED driver 324 may be brought into close physical proximity with, or even physical contact with, modular socket 306. This may cause, for instance, mechanical engagement element 334A of modular socket 306, which protrudes from housing 308 of modular socket 306, to enter into mechanical engagement element 334C of LED driver 324, which takes the form of a recess. Similarly, this may also cause mechanical engagement element 334B of modular socket 306, which once again protrudes from housing 308 of modular socket 306, to enter into mechanical engagement element 334D of LED driver 324, which takes the form of another recess. In some such embodiments, housing 336 of LED driver 324 may then be rotated somewhat to further engage and lock these mechanical engagement elements together.

FIG. 4 depicts a top side of modular socket 306. LED driver 324 is not depicted in FIG. 4. In FIG. 4, a power output interface 320 includes three female contacts or recesses for receiving the three male prongs 322 of LED driver 324 that were visible in FIG. 3. Similarly, an LED input interface 328 (similar to interface 128 of FIG. 1) and a sensor input interface 352 of modular socket 306 are visible and are configured for electrical coupling with elements 326, 350 visible in FIG. 3. In some embodiments, female contacts/recesses of power output interface 320 may be larger than the male prongs depicted in FIG. 3, so that when housing 336 of LED driver 324 is rotated relative to housing 308 of modular socket 306, the prongs have room to maneuver or provide for a polarity-locking mechanism.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty (“PCT”) do not limit the scope.

The invention claimed is:

1. A modular socket for removably receiving a light-emitting diode (“LED”) driver and coupling the LED driver to one or more LEDs, wherein the LED driver provides a modulated direct current to the one or more LEDs, the modular socket comprising:

a housing;

a modular socket power input interface to receive an alternating current (A/C) mains;

a modular socket power output interface electrically coupled with the modular socket power input interface within the housing;

a modular socket LED control input interface that is electrically coupled with one or more LEDs; and one or more mechanical engagements and locking structures, wherein the mechanical engagement of the one or more of the mechanical engagements and locking structures with one or more corresponding mechanical engagement and locking structures of the LED driver, and wherein the one or more mechanical engagements and locking structures simultaneously:

electrically couples the modular socket power output interface and an LED driver power input interface of the LED driver, wherein the LED driver power input interface receives the alternating current (A/C) mains and the LED driver provides the modulated direct current to an LED output interface of the LED driver, and electrically couples the modular socket LED control input interface and the LED output interface of the LED driver, to provide the modulated direct current to the one or more LEDs.

2. The modular socket of claim 1, wherein the electrical coupling effected by the mechanical engagement comprises a male pin being inserted into a female contact, and wherein the power output interface of the modular socket comprises the female contact.

3. The modular socket of claim 2, wherein the LED driver is substantially supported by the mechanical engagement.

4. The modular socket of claim 2, wherein the one or more mechanical engagements and locking structures comprise a plurality of mechanical engagements and locking structures positioned and spaced around a perimeter of the housing to provide a polarity-based locking mechanism.

5. The modular socket of claim 1, further comprising:

one or more sensor output interfaces;

wherein the one or more mechanical engagements further effects electrical coupling between one or more sensors electrically coupled with the modular socket and the LED driver.

6. The modular socket of claim 5, wherein the one or more sensors include a motion sensor.

7. The modular socket of claim 5, wherein the one or more sensors include a wireless communication interface.

8. The modular socket of claim 1, further comprising a removable health monitoring component that, when triggered, causes the modular socket to provide audible or visual output of a fault.

9. A luminaire comprising a luminaire housing, wherein the modular socket of claim 1 is mounted to the luminaire housing to expose the power output interface and the LED control input interface to an exterior of the luminaire housing.

10. A lighting assembly comprising:

a luminaire, and the modular socket according to claim 1.

11. The lighting assembly of claim 10, wherein the electrical coupling effected by the mechanical engagement comprises a male pin being inserted into a female contact, and wherein the power output interface of the modular socket comprises the female contact.

12. The lighting assembly of claim 11, wherein the LED driver is substantially supported by the mechanical engagement.

13. The lighting assembly of claim 11, wherein the one or more mechanical engagement structures comprise a plurality of mechanical engagement structures positioned and spaced around a perimeter or into the housing.

14. The lighting assembly of claim 10, further comprising:

one or more sensor output interfaces;

wherein the mechanical engagement further effects electrical coupled between one or more sensors electrically coupled with the modular socket and the LED driver.

15. The lighting assembly of claim 14, wherein the one or more sensors include a motion sensor.

* * * * *